US007350280B2

(12) United States Patent
Wiencek

(10) Patent No.: US 7,350,280 B2
(45) Date of Patent: Apr. 1, 2008

(54) METHOD TO SEAL REACTIVE MATERIALS UNDER VACUUM

(75) Inventor: Thomas C. Wiencek, Orland Park, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 11/585,595

(22) Filed: Oct. 24, 2006

(65) Prior Publication Data

US 2008/0040907 A1 Feb. 21, 2008

Related U.S. Application Data

(60) Provisional application No. 60/735,075, filed on Nov. 9, 2005.

(51) Int. Cl.
*B21D 33/00* (2006.01)
*B23P 11/00* (2006.01)

(52) U.S. Cl. .......................... 29/17.2; 29/428; 29/509; 29/525.14; 53/512; 53/434

(58) Field of Classification Search ................ 29/17.2, 29/428, 509, 525.14; 53/512, 434; 228/135, 228/173.1; 219/74
See application file for complete search history.

(56) References Cited

U.S. PATENT DOCUMENTS 4,057,949 A * 11/1977 Greffe ........................ 53/434
6,160,862 A * 12/2000 Wiencek et al. ........... 376/202
6,378,272 B1 * 4/2002 Archibald et al. ........... 53/412

FOREIGN PATENT DOCUMENTS

JP 02160174 A * 6/1990

* cited by examiner

*Primary Examiner*—Jermie E. Cozart
(74) *Attorney, Agent, or Firm*—Joan Pennington

(57) ABSTRACT

A method of sealing a low enriched uranium (LEU) foil in a vacuum is provided. The LEU foil is inserted into a stainless steel foil pouch. Sealing components are assembled with the stainless steel foil pouch with a vacuum pump connection extending through an opening in the pouch. Then an open end of the pouch is folded over and welded to form a vacuum tight bond. A vacuum pump is attached to the connection outside the pouch and the stainless steel foil pouch is evacuated. Then the stainless steel foil pouch is folded and welded to seal the LEU foil within a welded pouch portion. The remaining pouch portion including the vacuum sealing components is cut and separated from the welded pouch portion containing the LEU foil. The method uses on inexpensive readily available equipment, eliminating the need for electron beam welding equipment.

12 Claims, 2 Drawing Sheets

METHOD TO SEAL REACTIVE MATERIALS UNDER VACUUM

This application claims the benefit of U.S. Provisional Application No. 60/735,075, filed on Nov. 9, 2005.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a method of producing the radioisotope $^{99}$Mo, for example, from low enriched uranium (LEU) foils, while other enrichment may be used, and more particularly to a method of sealing an LEU foil in a vacuum so that the foil can be heat treated before being subjected to neutron irradiation.

DESCRIPTION OF THE RELATED ART

U.S. Pat. No. 6,160,862 to Thomas C. Wiencek et al., issued Dec. 12, 2000, entitled METHOD FOR FABRICATING $^{99}$MO PRODUCTION TARGETS USING LOW ENRICHED URANIUM, $^{99}$MO PRODUCTION TARGETS COMPRISING LOW ENRICHED URANIUM, discloses a radioisotope production target and a method for fabricating a radioisotope production target. The target comprises an inner cylinder, a foil of fissionable material circumferentially contacting the outer surface of the inner cylinder, and an outer hollow cylinder adapted to receive the substantially foil-covered inner cylinder and compress tightly against the foil to provide good mechanical contact therewith. The method for fabricating a primary target for the production of fission products comprises preparing a first substrate to receive a foil of fissionable material so as to allow for later removal of the foil from the first substrate, preparing a second substrate to receive the foil so as to allow for later removal of the foil from the second substrate; attaching the first substrate to the second substrate such that the foil is sandwiched between the first substrate and second substrate to prevent foil exposure to ambient atmosphere, and compressing the exposed surfaces of the first and second substrate to assure snug mechanical contact between the foil, the first substrate and the second substrate.

A publication entitled "PROGRESS IN DEVELOPING PROCESSES FOR CONVERTING $^{99}$Mo PRODUCTION FROM HIGH- TO LOW-ENRICHED URANIUM—1998" by C. Conner, M. W. Liberatore, A. Mutalib, J. Sedlet, D. Walker, and G F. Vandegrift, Chemical Technology Division, Argonne National Laboratory was presented at the 1998 International Meeting on Reduced Enrichment for Research and Test Reactors, Sao Paulo, Brazil, Oct. 18-23, 1998. This paper describes a method for heat-treating the uranium foil to produce a random small grain structure.

Since uranium is very reactive, the foil must be vacuum sealed in a suitable metal before heat treating. Previous methods required the use of electron beam welding equipment, which is expensive to operate and maintain, particularly in a third world country.

A need exists for an inexpensive method to vacuum seal a uranium foil in a stainless steel foil pouch using inexpensive readily available equipment.

A principal aspect of the present invention is to provide an improved method of sealing a low enriched uranium (LEU) foil in a vacuum so that the LEU foil can be heat treated.

Other important aspects of the present invention are to provide such method of sealing a low enriched uranium (LEU) foil in a vacuum substantially without negative effect and that overcome some of the disadvantages of prior art arrangements.

SUMMARY OF THE INVENTION

In brief, a method of sealing a low enriched uranium (LEU) foil in a vacuum is provided. The LEU foil is inserted into a stainless steel foil pouch Sealing components are assembled with the stainless steel foil pouch with a vacuum pump connection extending through an opening in the pouch. Then an open end of the pouch is folded over and welded to form a vacuum tight bond. A vacuum pump is attached to the connection outside the pouch and the stainless steel foil pouch is evacuated. Then the stainless steel foil pouch is folded and welded to seal the LEU foil within a welded pouch portion. The remaining pouch portion including the vacuum sealing components is cut and separated from the welded pouch portion containing the LEU foil.

In accordance with features of the invention, the method to vacuum seal a uranium foil in a stainless steel foil pouch uses inexpensive readily available equipment, eliminating the need for electron beam welding equipment.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Figure 1:
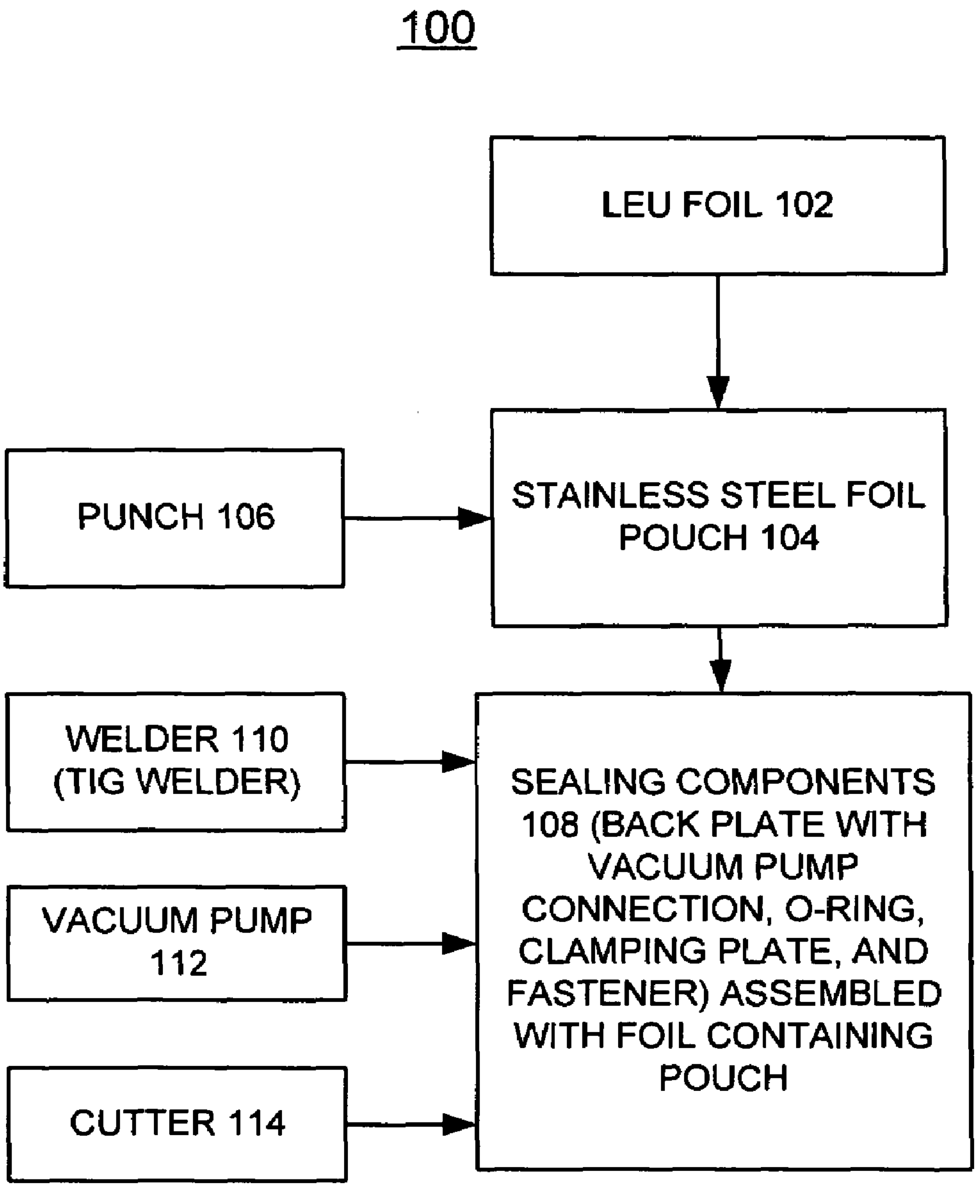
FIG. 1 is a block diagram illustrating exemplary apparatus for implementing a method of sealing a low enriched uranium (LEU) foil in a vacuum in accordance with the preferred embodiment.

Having reference now to the drawings, in FIG. 1 an exemplary apparatus generally designated by the reference character 100 for implementing a method of sealing a low enriched uranium (LEU) foil bag or pouch 102 in a vacuum in accordance with the preferred embodiment.

A stainless steel pouch 104, pre-welded on three sides, receives the LEU foil 102. An opening is formed in the stainless steel pouch 104 using a conventional punch 106. The opening is located near an open end of the stainless steel pouch 104 spaced apart from the LEU foil 102. A plurality of sealing components 108 are assembled with the LEU foil pouch 102 for sealing the opening in the bag to draw a vacuum.

Apparatus 100 further includes a welder 110, a vacuum pump 112, and a cutter 114 for cutting the vacuum-sealed pouch containing the LEU foil 102.

In accordance with features of the invention, apparatus 100 for implementing the method to vacuum seal the uranium foil 102 in a stainless steel foil pouch 104 uses only generally inexpensive readily available equipment, eliminating the need for electron beam welding equipment.

The preferred welding used in the method of the invention advantageously is tungsten inert gas (TIG) welding, which quickly and easily forms permanent vacuum tight (VT) bonds between stainless steel components. Thus, the need for electron beam welding equipment, which is expensive to operate and maintain and is required in known methods, is eliminated by the method of the invention. It should be understood that the invention is not limited to TIG welding; for example, another type of welding that could be used is Gas Metal Arc (MIG) welding.

The stainless steel pouch 104 can be implemented with various types of stainless steel, such as, 300-type stainless steel, 304-type stainless steel, or 316-type stainless steel. The stainless steel pouch 104 can be implemented with a thin foil, such as, 0.0025 inch thick, or thickness of less than 100 micrometers (0.0039 inches)

The stainless steel pouch 104 can be implemented with a commercially available products, for example, such as, "Sen/Pak" products manufactured and sold by THE SENTRY COMPANY, 62 Main Street, Foxboro, Mass. 02035-1847 U.S.A. The Sen/Pak Heat Treating Containers are made of high-chromium stainless steel, are used to enclose and protect work to be heat treated. Sen/Pak stainless steel containers implementing the stainless steel pouch 104 of the invention, provide a protective sheath, neutralizing entrapped atmosphere and delivering vacuum quality heat-treating for the LEU foil 102.

The welder 100 of the apparatus 100 advantageously is implemented with a tungsten inert gas (TIG) welder. The vacuum pump 112 can be implemented with various vacuum systems. For example, a diffusion pump can be used for vacuum pump 112.

The sealing components 108 include, for example, a back plate received within the stainless steel pouch 104 with a vacuum pump connection, and disposed outside the pouch a mating member including a sealing O-ring, and clamping plate and fastener assembled with the back plate.

Figure 2:
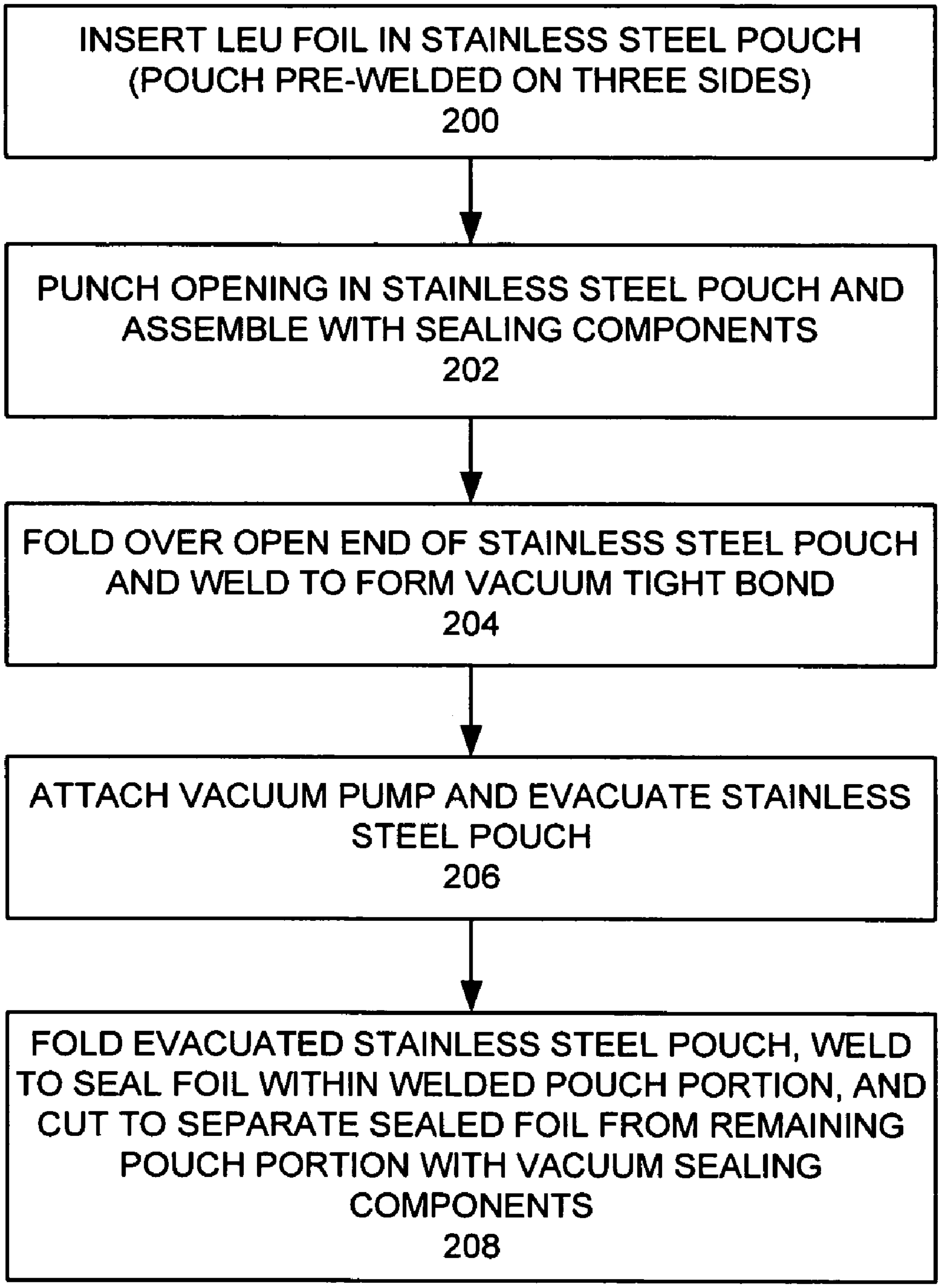
FIG. 2 is flow chart illustrating exemplary steps for implementing a method of sealing a low enriched uranium (LEU) foil in a vacuum.

Referring now to FIG. 2, first the LEU foil 102 is inserted into the stainless steel foil pouch 104 as indicated in a block 200. An opening is punched in the stainless steel foil pouch 104 and the stainless steel foil pouch 104 is assembled with the sealing components as indicated in a block 202.

An open end of the stainless steel foil pouch 104 is folded over and welded to make a vacuum tight (VT) bond as indicated in a block 204. A vacuum pump is attached and the stainless steel foil pouch 104 is evacuated as indicated in a block 206.

After evacuation the stainless steel foil pouch 104 is folded, for example, generally in the center spaced apart from the evacuation port opening, welded to form a vacuum tight seal and cut down the center above the weld as indicated in a block 208. The LEU foil 102 is now sealed in a vacuum tight container 104 and ready to heat treatment.

The method of the preferred embodiment has been demonstrated. A surrogate foil was sealed and a vacuum was confirmed after sealing. The vacuum sealed foil was not tested by immersion in a heat treating bath; however, foils sealed with the prior art vacuum sealing method using electron beam welding were successfully heat treated, it is assumed that this method will also provide acceptable results.

In accordance with features of the invention, since the foil pouches 102 are 0.0025 in. thick, as compared to 0.015 in. for the original electron beam welding process, the cooling rate will be faster and will produce finer grains.

Also it may be possible to use a longer pouch or a pouch 102, which does not have to be sealed by welding. This would allow for reuse of the pouch. If the sample can be kept under dynamic vacuum, the end of the pouch could be dipped into the quenching media and then opened to remove the foil. The precise level of vacuum required for successful heat treatment is not known at this time. However, this process of the invention can be generally applied, for example, with any level of roughing pump (approximately 10 μm Hg) vacuum produced by any vacuum system. The original prior art process used a diffusion pump for the vacuum.

Experimental foils have been made of an "adjusted" uranium alloy, containing 1000 ppm aluminum and 450 ppm iron. To produce fine-grained (<50 μm) material, the piece needs to be heated into the β region (668° C.<T<758° C.) and then rapidly cooled. We used a molten-lead bath to heat-treat the foils. The last step in the fabrication of uranium foils is cold rolling to the final thickness (130 μm). This cold rolling induces preferred orientation of the crystal structure in the uranium foil. The prior art method for β-quenching these thin foils produces a fine, randomly oriented grain structure. A fine randomly oriented grain structure is required to prevent tearing the fission fragment barriers. After heat treatment the foils can, for example, either be electroplated or wrapped before final assembly of the targets.

While the present invention has been described with reference to the details of the embodiments of the invention shown in the drawing, these details are not intended to limit the scope of the invention as claimed in the appended claims.

What is claimed is:

1. A method of sealing a low enriched uranium (LEU) foil in a vacuum comprising the steps of:

inserting the LEU foil into a stainless steel foil pouch;

assembling sealing components with the stainless steel foil pouch to provide a vacuum pump connection extending through an opening in the pouch;

folding over and welding an open end of the pouch to form a vacuum tight bond;

attaching a vacuum pump to the vacuum pump connection outside the pouch and evacuating the stainless steel foil pouch;

folding and welding the stainless steel foil pouch to seal the LEU foil within a welded pouch portion;

cutting and separating a remaining pouch portion including the vacuum sealing components from the welded pouch portion containing the LEU foil.

2. A method of sealing a low enriched uranium (LEU) foil as recited in claim 1 wherein the steps of welding include Tungsten Inert Gas (TIG) welding.

3. A method of sealing a low enriched uranium (LEU) foil as recited in claim 1 wherein inserting the LEU foil into a stainless steel foil pouch includes the step of providing a stainless steel foil pouch pre-welded on three sides.

4. A method of sealing a low enriched uranium (LEU) foil as recited in claim 3 includes providing said stainless steel foil pouch having a thickness of about 0.0025 inch.

5. A method of sealing a low enriched uranium (LEU) foil as recited in claim 3 includes providing said stainless steel foil pouch having a thickness of less than 100 micrometers.

6. A method of sealing a low enriched uranium (LEU) foil as recited in claim 3 includes providing said stainless steel foil pouch formed of high-chromium stainless steel.

7. A method of sealing a low enriched uranium (LEU) foil as recited in claim 1 wherein assembling sealing components with the stainless steel foil pouch to provide a vacuum pump connection extending through an opening in the pouch includes the step of inserting a backing plate inside the stainless steel foil pouch and the backing plate including the vacuum pump connection extending through the opening.

8. A method of sealing a low enriched uranium (LEU) foil as recited in claim 7 further includes assembling a mating member and clamping plate disposed outside the pouch with the backing plate.

9. A method of sealing a low enriched uranium (LEU) foil as recited in claim 7 further includes providing the mating member with a sealing O-ring.

10. A method of sealing a low enriched uranium (LEU) foil as recited in claim 1 further includes the step of punching said opening in the stainless steel foil pouch.

11. A method of sealing reactive material under vacuum comprising the steps of:

inserting the reactive material into a stainless steel foil pouch;

punching a vacuum port hole into one side of the stainless steel pouch;

assembling sealing components with the stainless steel foil pouch to provide a vacuum pump connection extending through the vacuum port hole in the stainless steel foil pouch;

folding over and welding an open end of the stainless steel foil pouch to form a vacuum tight bond;

attaching a vacuum pump to the vacuum pump connection outside the pouch and evacuating the stainless steel foil pouch;

folding and welding the stainless steel foil pouch to seal the reactive material within a welded pouch portion;

cutting and separating a remaining pouch portion including the vacuum sealing components from the welded pouch portion containing the reactive material.

12. A method of sealing reactive material under vacuum as recited in claim 11 wherein the steps of welding include Tungsten Inert Gas (TIG) welding.

* * * * *